United States Patent

Azuma

[11] 3,981,227
[45] Sept. 21, 1976

[54] POWER PISTON OF BOOSTER
[75] Inventor: Tomizo Azuma, Yamato, Japan
[73] Assignee: Tokico Ltd., Japan
[22] Filed: Dec. 18, 1974
[21] Appl. No.: 533,754

[30] Foreign Application Priority Data
Dec. 29, 1973  Japan.................................. 49-363

[52] U.S. Cl. ........................... 91/376 R; 91/369 B; 92/98 D; 92/99
[51] Int. Cl.² ..................... F15B 9/10; F01B 19/00; F16J 3/02
[58] Field of Search .......... 91/369 A, 369 B, 369 R; 92/99, 98 R, 98 D

[56] References Cited
UNITED STATES PATENTS
3,754,450   8/1973   Putt et al. ......................... 91/369 A Primary Examiner—Paul E. Maslousky
Attorney, Agent, or Firm—Wenderoth, Lind & Ponack

[57] ABSTRACT

In a power piston for use in a booster which includes a piston plate coupled with a diaphragm for receiving differential pressure acting thereacross, a valve body one end of which being secured to the center portion of the piston plate and a valve mechanism disposed in the valve body, the improvement resides in that there are provided a head portion and a hole respectively on one end of the valve body and in the center portion of the piston plate which have complementary configurations such that the hole can receive the head portion only when they are at specific angular positions, and there is provided a neck portion continuous with the head portion of the valve body and having an axial length sufficient to receive the piston plate thereon, the inner circumferential portion of the diaphragm is clamped by means of the piston plate and thus secured to the valve body.

3 Claims, 6 Drawing Figures

POWER PISTON OF BOOSTER

BACKGROUND OF THE INVENTION

This invention relates to a power piston for use in a booster and, more particularly, to a fastening mechanism for a valve body and a piston plate, when the power piston can be disassembled into the piston plate and the valve body.

A typical vacuum booster includes a valve body positioned in the center portion of a booster body or a casing and a piston plate positioned around the valve body and adapted to receive the differential pressure exerted on a diaphragm which divides the interior of the casing into two chambers. Usually, the valve body and the piston plate are fastened each other with bolts, while the inner circumferential portion of the diaphragm is clamped therebetween. The bolts are inserted through openings formed in the piston plate and then threaded into threaded holes provided in the valve body. Since the valve body is formed with air passages, the threaded holes are positioned radially outside the air passages, so that the outer diameter of the valve plate becomes considerably large. On the other hand, the threaded holes should have axial depth sufficient for achieving required tightening force, so that the thickness or the axial length of the valve body in its outer circumferential portion should necessarily be increased. The tightening stress and the thermal stress acting around the threaded hole portion present additional problems, particularly when the valve body is made of synthetic resin. In addition, since the heads of the fastening bolts project from the front surface of the piston plate, this imposes another problem in design and arrangement of the other members such as a fulcrum plate or the like and increases the axial length of the booster.

SUMMARY OF THE INVENTION

The present invention is directed to avoid the aforesaid shortcomings by providing a new and improved fixing or fastening mechanism for a valve body and a piston plate in a conventional booster.

According to the present invention, there is provided a power piston for use in a booster, which power piston includes a valve body and a piston plate, a head portion and a hole portion being provided on one end of the valve body and in the center portion or the inner circumference of the piston plate, respectively, which have complementary configurations such that the hole can receive the head portion only when they are at specific angular positions. the head portion of the valve body is connected with a neck portion of the valve body, and the axial length of the neck portion is sufficient to receive the piston plate therearound. Whereby, by bringing the inner circumferential edge portion of a diaphragm into sandwitched relation between the piston plate and the valve body, the piston plate and the diaphragm may be clamped or secured to the valve body by causing only small relative angular movements between the piston plate and the valve body.

The present invention will now be described in more detail in conjunction with the accompanying drawings exemplifying embodiments of this invention.

DESCRIPTION OF PREFERRED EMBODIMENTS

Figure 1:
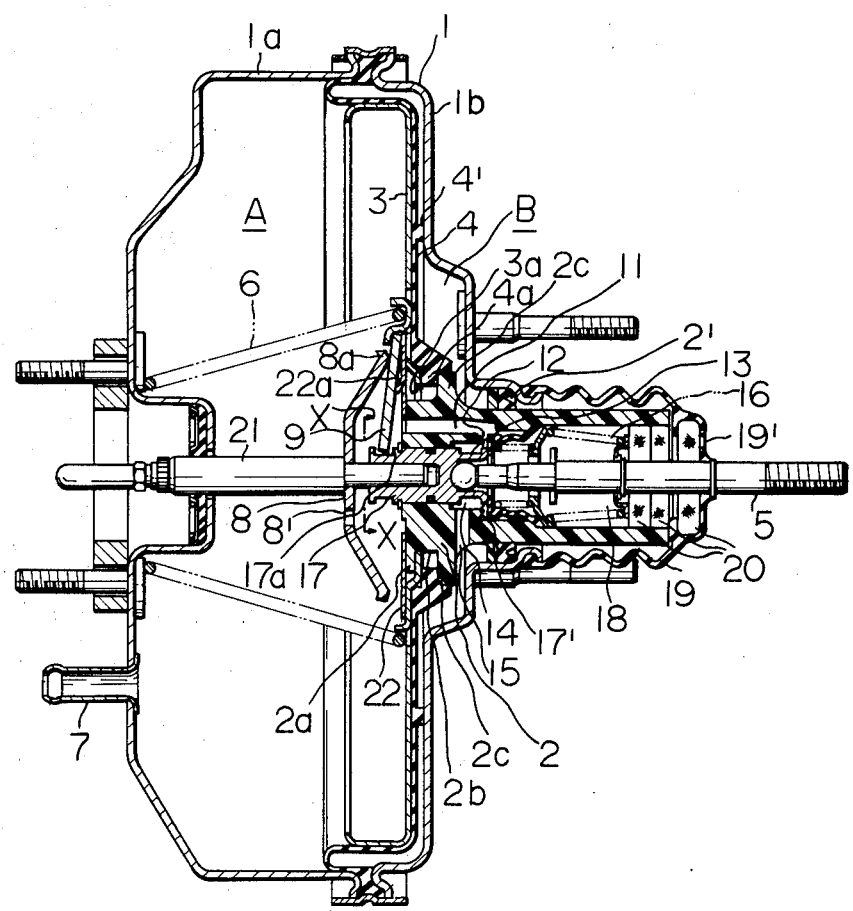
FIG. 1 is a longitudinal cross-sectional view showing a vacuum booster including a power piston according to the present invention.
Figure 2:
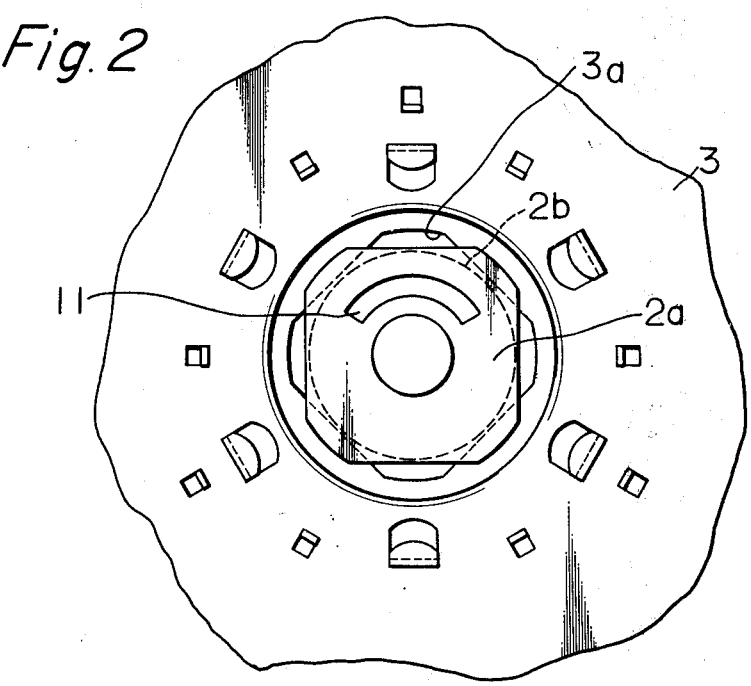
FIG. 2 is a side elevational partial view of the valve body and the piston plate in an assembled condition looking in the direction of arrow X—X in FIG. 1, in which the reaction lever and the fulcrum plate are removed for the sake of clearness.
Figure 3:
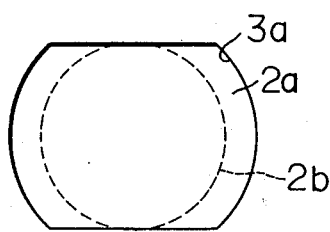
FIG. 3 is a view showing another example of the configurations of the head portion of a valve body and the hole in a piston plate.
Figure 3:
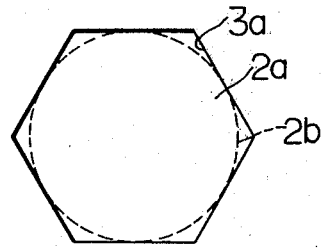

Referring to FIG. 1, a casing 1 of a vacuum booster includes two portions 1a and 1b a valve body 2 is slidably and sealingly held by means of a seal 2' secured to the casing portion 1b of the booster. A diagram 4 which divides the interior of the casing 1 into two chambers A and B is adapted to cooperate with a piston plate 3 for receiving differential pressure caused by pressure difference between the two chambers A and B. The valve body 2 is formed at its one end (the left end in FIG. 1, i.e., on the master cylinder side) with a head portion 2a of a shape as shown in FIG. 2, while the piston plate 3 is formed in its center portion with a hole 3a complementary with the shape of the head portion 2a of the valve body 2 as shown in FIG. 2. The configurations of the hole 3a and the head portion 2a are such that the hole 3a can receive the head portion 2a only when they are at specific angular positions relative to each other, while aligned axially. In FIG. 2 the hole 3a and the head portion 2a are shown to have generally rectangular configurations, but they may be modified as shown in FIG. 3, to any desired configurations other than a circle, preferably having an inscribed circle of a suitable size.

Figure 4:
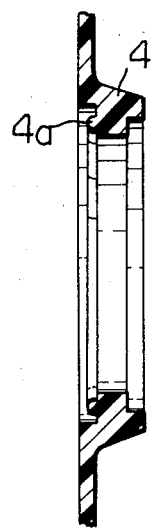
FIG. 4 is a partial cross-sectional view showing the inner circumferential portion of a diaphragm.

Continuous with the head portion 2a of the valve body 2 is a neck portion or reduced diameter 2b having an axial length sufficient to receive the piston plate 3. The cross-sectional shape of the neck portion 2b is adapted to permit the angular rotation of the piston plate 3 received therearound, although the above shape of the neck portion 2b should preferably be an inscribed circle of the shape of the head portion 2a or the hole 3a. Continuous with the neck portion 2b of the valve body is an enlarged diameter portion or a projecting portion 2c of an annular form, thus defining a shoulder between the neck portion 2b. The shoulder is adapted to cooperate with the head portion 2a so as to clamp the inner circumferential portions of the diaphragm 4 and the piston plate 3 therebetween. As shown in FIG. 4, the inner circumferential portion of the diaphragm 4 is formed with an annular axial projection 4a which is adapted to be compressed when the clamping force is applied thereto.

Accordingly, in the power piston arrangement shown, the inner circumferential portion of the diaphragm 4 is located on and around the annular projecting portion 2c and the neck portion 2b of the valve body 2, after which, the head portion 2a of the valve body 2 is inserted into the hole 3a of the piston plate 3, with the relative angular positions being in register with each other, and then the piston plate 3 is forced in the axial direction of the valve body against resilient force of the diaphragm 4. After the head portion 2a has passed through the hole 3a, the piston plate 3 and the valve body 2 are rotated relatively (through a small angle of, say, 45°, preferably, in the embodiment of FIG. 2). Then, the inner circumferential portions of the diaphragm 4 and the piston plate 3 are secured to the valve body 2, due to the resiliency of the diaphragm 4.

Figure 5:
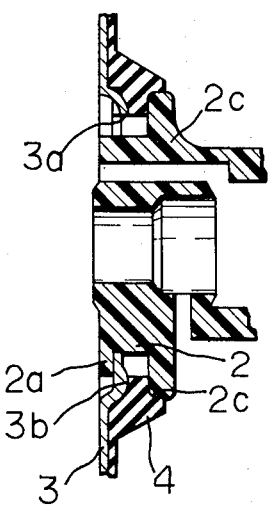
FIG. 5 is a partial cross-sectional view showing a modification of the power piston of FIG. 1.

In FIG. 5, the piston plate 3 is formed with an annular projection 3b, rather than the aforesaid annular projection 4a on the diaphragm, so that the corresonding portion of the diaphragm 4 may be compressed on the projection 3b to achieve the same effect.

According to the power piston of the present invention, there is no need to provide fastening bolts as in the conventional power piston, because this invention provides the intended fastening relation by rotating the valve body 2 relative to the piston plate 3 through a small angle. After the aforesaid fastening operation, the outer circumferential portion of the diaphragm 4 is secured between the casing portions 1a and 1b.

Figure 6:
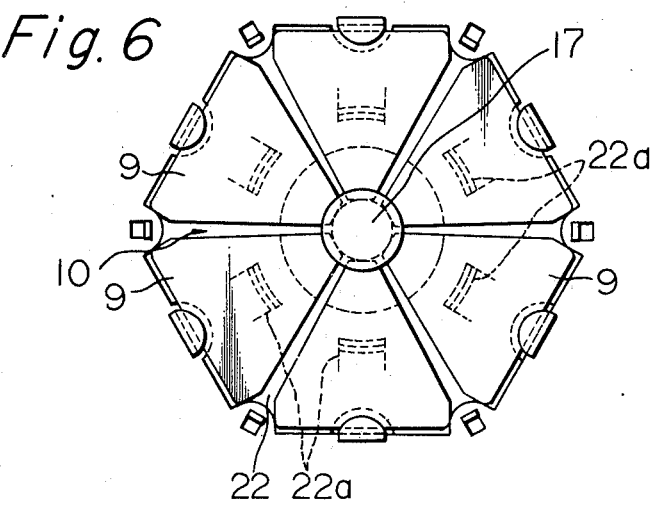
FIG. 6 is a side elevational view showing a fulcrum plate in FIG. 1 in an assembled condition.

A brief description will now be given of the arrangement and operation of the vacuum booster shown in the drawing. When an input shaft 5 connected to a brake pedal or the like (not shown) is not pressed, the valve body 2 and the piston plate 3 are urged to the right as viewed in FIG. 1 under the action of a return spring 6, so that stoppers 4' formed on the diaphragm 4 abut with the inner wall of the casing portion 1b. The chamber A which is communicated with a source of vacuum such as a manifold of an engine through a vacuum port 7 is in communication with the chamber B, by way of a hole 8' in a fulcrum plate 8, a clearance 10 defined between reaction levers 9 (FIG. 6), a passage 11 formed in the valve body 2, a clearance between a valve seat 12 formed on the valve body 2 and a seal 13 acting as a poppet valve for cooperating with the valve seat 12, a chamber 14, and a passage 15, so that both chambers A and B are maintained in same vacuum pressure. As a result, the diaphragm 4 and hence the valve body 2 will not move.

When the input shaft 5 is moved to the left as viewed in FIG. 1 by depressing the brake pedal or the like against a force of a return spring 16, the seal 13 is allowed to advance relative to the valve body 2 and, then engages with the valve seat 12 thereby blocking communication between chambers A and B. When the input shaft 5 is further advanced, a valve seat 17' of a plunger 17, which moves together with the input shaft 5 along a central opening of the valve body 2, is moved apart from the seal 13 so that a chamber 18 is brought into communication with the chamber B through the chamber 14 and the passage 15. The chamber 18 is communicated with the atmosphere by way of an intake port 19' in a boot 19 and a series of air cleaners 20, thus, pressure in the chamber B becomes close to atmospheric pressure, so that there results a pressure difference between the chambers A and B and, as a result, the diaphragm 4, the valve body 2 and the piston plate 3 will move to the left together as viewed in FIG. 1. The piston plate 3 urges a piston rod 21 by means of the reaction levers 9 and the fulcrum plate 8, thereby operating a master cylinder device (not shown) which is attached at the left end of the booster.

A reaction force of hydraulic pressure generated in the master cylinder device and that of return spring will act on the input shaft 5, but in the vacuum booster shown in the drawing, the reaction force of hydraulic pressure in the master cylinder is not permitted to be applied on the input shaft 5 unless the hydraulic pressure exceeds a predetermined level. For this end, the radially extending outer edge portion of the reaction lever 9 is clamped between the piston plate 3 and an annular projecting portion 8a of the fulcrum plate 8, while a plate member 22 formed of resilient material is positioned between the piston plate 3 and the reaction lever 9. A plurality of projections 22a are formed on the plate member 22 at the circumferentially equal spacing for abutting with the reaction lever 9, whereby the radially extending inner edge portion of the reaction lever 9 is positioned normally at a predetermined distance from a shoulder 17a of the plunger 17. Accordingly, the reaction force acting on the piston rod 21 will not be transmitted to the input shaft 5 unless the input shaft 5 has been moved to the left in FIG. 1 and the reaction force acting on the piston rod 21 has bent the resilient projections 22a of the plate member 22 by the medium of the fulcrum plate 8 to thereby incline the reaction lever 9 towards the shoulder 17a of the plunger 17, so that the inner edge portion of the reaction lever 9 abuts with the shoulder 17a of the plunger 17. Therefore, the ineffective input force or the input force which shall be applied prior to the actuation of the booster may be decreased.

When the input force applied to the input shaft 5 is reduced, there is created a clearance between the valve seat 12 of the valve body 2 and the seal 13, so that the pressure in the chamber B will decrease due to vacuum pressure in the chamber A, thus an equilibrium among the reaction force on the piston rod 21, the respective spring forces, differential pressure acting across the power piston, and the input force on the input shaft 5 will be attained according to the relative position of the input shaft 5. When the input force on the input shaft 5 is reduced to zero, the booster will return to the inoperative condition shown in FIG. 1.

The arrangement of the booster which has been described thus far, shows only an example of vacuum boosters, and the power piston of the present invention may be applied to any type of a vacuum booster.

As is apparent from the foregoing description, the power piston according to the present invention may easily be assembled due to the fact that the piston plate, the valve body and the diaphragm are clamped with each other in an air-tight relationship by rotating the piston plate and the valve body through a small angle. The assembling operation is quite simple and efficient as compared with the conventional operation using a plurality of bolts. In addition, it is not necessary to provide a special means for fastening the valve body to the diaphragm in air-tight relation. Further, since there is no need to provide threaded holes in the valve body, that the outer diameter and the wall thickness of the outer peripheral portion of the valve body may be reduced, and hence there may be achieved a compact sized booster with freedom from the problems such as stress concentration around the threaded hole. Still furthermore, any fastening bolts which project from the end surface of the valve body are not provided, so any desired arrangement can be afforded for the fulcrum plate or the reaction lever. Accordingly, the power piston according to the present invention is well adapted for use in a booster using a reaction lever as given in the embodiments.

What is claimed is:

1. A power piston assembly for use in a booster, said assembly comprising:

resilient diaphragm means within said booster for dividing the interior of said booster into two chambers, said diaphragm means having a first opening therethrough;

rotatable piston plate means adjacent said diaphragm means for receiving the differential pressure caused by the pressure difference between said two chambers, said piston plate means having a second opening therethrough of non-circular configuration coaxially aligned with said first opening; and valve means adjacent the side of said diaphragm means opposite the side adjacent said piston plate means, extending through said first and second openings, and fitted against the side of said piston plate means opposite the side thereof and adjacent said diaphragm means for controlling communication between said two chambers and for resiliently holding said diaphragm means against said piston plate means, said valve means having:

a main body portion adjacent said diaphragm means, a neck portion projecting axially from one end of said main body portion and extending through said first and second openings, and a head portion of non-circular configuration attached to the free end of said neck portion extending through said first and second openings, said head portion slidable through said first and second holes, and in contact with said rotatable piston plate means when said piston plate means is rotated relative to the position of said head portion.

2. A power piston assembly as claimed in claim 1 wherein:

said head portion of said valve means and said second opening through said piston plate both have generally the same dimensions and the configuration of a regular polygon defining as inscribed circle; and said neck portion of said valve means has a cross-section substantially equal to the inscribed circle defined by the regular polygonal configuration of said head portion and said second opening.

3. A power piston assembly as claimed in claim 1 further comprising a resiliently deformable annular projection projecting toward said piston plate means from the side of the inner peripheral surface of said diaphragm means surrounding said first opening, whereby a resilient clamping force is developed when said diaphragm means and said piston plate means are clamped together between said head portion and said main body portion when said head portion extends through said openings and is in contact with said rotated piston plate means.

* * * * *